United States Patent
Rodriguez et al.

(10) Patent No.: US 9,217,369 B2
(45) Date of Patent: Dec. 22, 2015

(54) COMPRESSOR INLET MANIFOLD FOR A GAS TURBINE ENGINE

(75) Inventors: Jose L. Rodriguez, Lake Mary, FL (US); James W. O'Brien, Hamilton (CA)

(73) Assignee: Siemens Aktiengesellschaft, München (DE)

( * ) Notice: Subject to any disclaimer, the term of this patent is extended or adjusted under 35 U.S.C. 154(b) by 906 days.

(21) Appl. No.: 13/420,643

(22) Filed: Mar. 15, 2012

(65) Prior Publication Data

US 2013/0243586 A1    Sep. 19, 2013

(51) Int. Cl.
| | |
|---|---|
| F02C 7/04 | (2006.01) |
| F04D 29/42 | (2006.01) |
| F04D 29/44 | (2006.01) |
| F04D 29/54 | (2006.01) |
| F04D 29/66 | (2006.01) |

(52) U.S. Cl.
CPC .............. *F02C 7/04* (2013.01); *F04D 29/4213* (2013.01); *F04D 29/441* (2013.01); *F04D 29/541* (2013.01); *F04D 29/667* (2013.01); *F05D 2210/43* (2013.01); *F05D 2240/126* (2013.01); *F05D 2270/102* (2013.01)

(58) Field of Classification Search
CPC .............. F01D 1/04; F01D 9/048; F01D 9/02; F01D 9/026; F01D 9/04; F01D 9/041; F04D 29/4213; F04D 29/441; F04D 29/444; F04D 29/541; F04D 29/542; F04D 29/544; F04D 29/545; F04D 29/547; F02C 7/04; F05D 2220/40; F05D 2230/60; F05D 2260/96; F05D 2260/961; F05D 2240/11; F05D 2300/6033

USPC .............. 415/183–185, 191, 203–205, 208.1, 415/208.2
See application file for complete search history.

(56) References Cited

U.S. PATENT DOCUMENTS

| | | | | |
|---|---|---|---|---|
| 3,005,618 A | * | 10/1961 | Buchi | 415/184 |
| 7,559,742 B2 | * | 7/2009 | Inoue et al. | 415/184 |
| 7,574,867 B2 | * | 8/2009 | Teets et al. | 60/792 |
| 7,625,173 B2 | | 12/2009 | Mehring | |
| 2006/0024152 A1 | | 2/2006 | Wiedermann et al. | |

(Continued)

FOREIGN PATENT DOCUMENTS

| | | |
|---|---|---|
| DE | 4326800 A1 | 2/1995 |
| EP | 955456 A2 | 11/1999 |

(Continued)

*Primary Examiner* — Edward Look
*Assistant Examiner* — Danielle M Christensen

(57) ABSTRACT

A compressor inlet manifold for directing air from a radial airflow inlet into an axial compressor inlet of a compressor of a gas turbine engine is disclosed. The compressor inlet manifold provides air flow to the compressor with reduced distortion to the compressor which enables the required design surge margin to be reduced, thereby increasing gas turbine engine efficiency. The improved air flow has reduced distortion, turbulence and unsteadiness. The compressor inlet manifold body may have at least one annular opening extending axially downstream from an upstream wall. Air flow into the compressor inlet manifold may be conditioned with one or more of a flow improvement projection extending radially inward relative to other aspects of a compressor inlet outer wall, a conically shaped inner sidewall, and a baffle positioned at an acute angle relative to an axis aligned with a radially inward air flow.

34 Claims, 14 Drawing Sheets

(56) References Cited

U.S. PATENT DOCUMENTS

2009/0280006 A1* 11/2009 Thayer ............................ 415/191
2010/0172753 A1* 7/2010 Lin et al. ...................... 415/208.1

FOREIGN PATENT DOCUMENTS

| | | |
|---|---|---|
| EP | 1933041 A2 | 6/2008 |
| WO | 2008111098 A1 | 9/2008 |

* cited by examiner

COMPRESSOR INLET MANIFOLD FOR A GAS TURBINE ENGINE

FIELD OF THE INVENTION

This invention is directed generally to turbine engines, and more particularly to manifolds for directing air into a compressor of a gas turbine engine.

BACKGROUND

Typically, gas turbine engines include a compressor for compressing air, a combustor for mixing the compressed air with fuel and igniting the mixture, and a turbine blade assembly for producing power. Air is channeled inwardly toward the compressor through a radially extending compressor inlet manifold which redirects the air axially to the compressor. Typical compressor inlet manifold configurations create unsteady airflow into the compressor, which negatively affects performance of the compressor and the turbine engine. In a typical system, the side of the compressor inlet manifold that is closest to the compressor inlet usually has more mass flow while the opposite side is subject to reduced airflow. In addition, typical compressor inlet manifolds have some form of unsteady loss generating recirculation and stagnant air at the bottom of the compressor inlet. Thus, a more efficient compressor inlet manifold is needed.

SUMMARY OF THE INVENTION

This invention relates to a compressor inlet manifold for directing air from a radial airflow inlet into an axial compressor inlet of a compressor of a gas turbine engine. The compressor inlet manifold may provide air flow with reduced distortion to the compressor which enables the required design surge margin to be reduced, thereby enabling increased gas turbine engine efficiency. The improved air flow has reduced distortion, turbulence and unsteadiness. The compressor inlet manifold may also minimize temporal and spacial nonuniformities in the compressor inlet flow. The compressor inlet manifold may include a compressor inlet manifold body attachable to a compressor inlet case and having one or more annular openings extending axially downstream from an upstream wall. Air flow into the compressor inlet manifold, and specifically into the annular opening, may be conditioned with one or more of a flow improvement projections extending radially inward relative to other aspects of a compressor inlet outer wall, a conically shaped inner sidewall, and a baffle positioned at an acute angle relative to an axis aligned with radially inward air flow in the compressor inlet manifold.

The compressor inlet manifold may include a compressor inlet manifold body having one or more annular openings extending axially downstream from a position near an upstream wall of the compressor inlet manifold. The compressor inlet manifold may also include a compressor inlet outer wall at least partially extending around the annular opening and attached to the upstream wall. A compressor airflow inlet may be in fluid communication with the radial airflow inlet and the annular opening, wherein the compressor airflow inlet is positioned downstream from the annular opening, which is positioned downstream from the compressor inlet outer wall.

The compressor inlet outer wall may include a flow improvement projection extending radially inward relative to other aspects of the compressor inlet outer wall. The flow improvement projection may be formed from a cusp that points at a center of the annular opening. The flow improvement projection may also be formed from curved first and second sides, wherein a distal point at which the first and second sides has a smaller cross-sectional area than a cross-sectional area at a proximal base from which the flow improvement projection extends. In particular, the flow improvement projection may be formed from curved first and second sides having a smaller radii than the compressor inlet outer wall. In another embodiment, the flow improvement projection may be formed from linear first and second sides, wherein a distal point at which the first and second sides has a smaller cross-sectional area than a cross-sectional area at a proximal base from which the flow improvement projection extends. In another embodiment, the improvement projection may be formed from a linear plate that extends toward a center of the annular opening.

The flow improvement projection may be positioned equidistant between opposing portions of the compressor inlet outer wall that form first and second radially outer walls. In another embodiment, the flow improvement projection may be offset such that the flow improvement projection is closer to the second radially outer wall forming a portion of the compressor inlet outer wall than a first radially outer wall forming a portion of the compressor inlet outer wall opposite to the second radially outer wall. The flow improvement projection may also be offset such that the flow improvement projection is closer to the second radially outer wall than the annular opening.

The compressor inlet outer wall may have a number of different configurations to reduce turbulence. The compressor inlet outer wall may be formed from first and second radially outer walls that generally oppose each other and are coupled together with an outer end wall, wherein the outer end wall is formed from a single curved side. In another embodiment, the compressor inlet outer wall may be formed from first and second radially outer walls that generally oppose each other and are coupled together with an outer end wall, wherein the outer end wall may be formed from a plurality of curved sides coupled together in series. The compressor inlet outer wall may also be formed from first and second radially outer walls that generally oppose each other and are coupled together with a single linear sides extending therebetween. In another embodiment, the compressor inlet outer wall may be formed from first and second radially outer walls that generally oppose each other and are coupled together with an outer end wall, wherein the outer end wall may be formed from a plurality of linear sides coupled together at obtuse angles. The plurality of linear sides may be coupled together via curved transition sections smaller than the linear sides forming the outer end wall. The flow improvement projection may extend from a linear side of the outer end wall that is positioned at an obtuse angle relative to the second radially outer wall.

At least a portion of an inner surface forming the annular opening may be formed from a cylindrical sidewall. In particular, at least a portion of an inner surface forming the annular opening may be formed from a conically shaped inner sidewall with a smaller diameter positioned downstream. In one embodiment, the annular opening may be formed from a first conically shaped inner sidewall with a smaller diameter positioned downstream and a second conically shaped inner sidewall with a yet smaller diameter positioned downstream, wherein the second conically shaped inner sidewall is steeper than the first conically shaped inner sidewall. The second conically shaped inner sidewall may also be equal to or less than the first conically shaped inner sidewall.

The annular opening may be positioned equidistant between opposing portions of the compressor inlet outer wall that form first and second radially outer walls. In another embodiment, the annular opening may be offset such that the annular opening is closer to a second radially outer wall forming a portion of the compressor inlet outer wall than a first radially outer wall forming a portion of the compressor inlet outer wall opposite to the second radially outer wall.

In another embodiment, the annular opening may be formed from an downstream inner sidewall and a upstream inward recess radially inward and upstream from the downstream inner sidewall. The downstream inner sidewall may be conically shaped with a cross-sectional area that increases moving downstream.

The compressor inlet manifold may also include one or more baffles positioned radially upstream from the annular opening such that the baffle extends radially inward toward the annular opening and is angled radially outward from the annular opening such that the baffle is positioned at an acute angle relative to an axis aligned with a radially inward air flow. The baffle may further condition the airflow. The baffle may also be used to as a closing valve or shutoff valve to the compressor. The baffle may be positioned radially upstream from the annular opening formed from a first baffle and a second baffle that is a mirror image of first baffle about the axis. The baffle may have a length that is greater than a width of an opening of the annular opening. The baffle may have an upstream section that is generally linear, and a downstream section that is generally linear and positioned at an obtuse angle relative to the upstream section. The baffle may taper at a trailing edge of the baffle such that the trailing edge has a width that is less than a width in a mid-section of the baffle.

In at least one embodiment, the compressor inlet manifold may include a plurality of baffles. The plurality of baffles may form two rows, wherein each row may have multiple baffles in series. The baffle may be pivotably positioned within the compressor inlet manifold body such that the position of the baffle may be changed. A trailing edge of the baffle may terminate radially outward of the annular opening.

During use, air flows through the radial airflow inlet and into the compressor inlet manifold. The airflow is conditioned in the compressor inlet manifold. In particular, the air flows past one or more baffles, which impart a radially outward vector to the direction of airflow towards the annular opening. The air may also contact the compressor inlet outer wall, wherein the direction of the air is redirected by the flow improvement projection such that the air is further redirected back towards the annular opening. The compressor inlet manifold may provide air flow with reduced turbulence to the compressor which enables the required design surge margin to be reduced, thereby increasing gas turbine engine efficiency. The improved air flow has reduced distortion, turbulence and unsteadiness. The air is exhausted into the axial compressor inlet.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
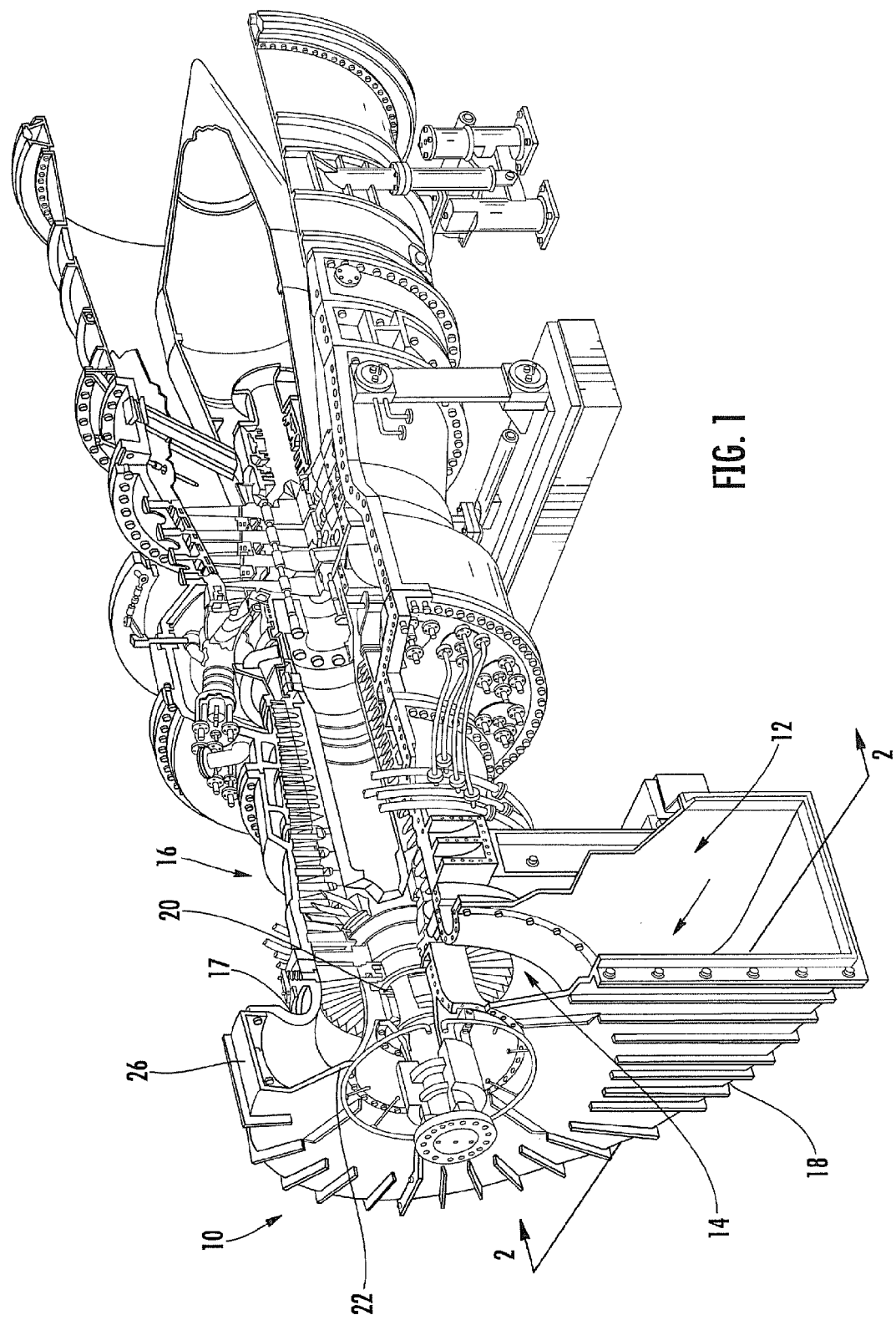
FIG. 1 is a perspective view of a gas turbine engine with a partial cross-sectional view with a compressor inlet manifold.

As shown in FIGS. 1-19, this invention is directed to a compressor inlet manifold 10 for directing air from a radial airflow inlet 12 into an axial compressor airflow inlet 14 of a compressor 16 at a compressor inlet case 17 of a gas turbine engine. The compressor inlet manifold 10 may provide air flow with reduced distortion to the compressor 16 which enables the design surge margin to be reduced, thereby increasing gas turbine engine efficiency. The improved air flow has reduced distortion, turbulence and unsteadiness. The compressor inlet manifold 10 may also minimize temporal and spacial nonuniformities in compressor inlet flow. The compressor inlet manifold 10 may include a compressor inlet manifold body 18 having one or more annular openings 20 extending axially downstream from an upstream wall 22. Air flow into the compressor inlet manifold 10, and specifically into the annular opening 20, may be conditioned with one or more of a flow improvement projections 24 extending radially inward relative to other aspects of a compressor inlet outer wall 26, a conically shaped inner sidewall 28, and a baffle 30 positioned at an acute angle relative to an axis 32 aligned with a radially inward air flow in the compressor inlet manifold 10.

The compressor inlet outer wall 26 of the compressor inlet manifold 10 may be at least partially extending around the annular opening 20. The annular opening is sized 20 to surround a portion of the turbine engine rotor, bearings and related components, not shown. The compressor inlet outer wall 26 may be curved and have a diameter, such as, but not limited to, about twice that of a diameter of the annular opening 20. The compressor inlet outer wall 26 may be concentric with the annular opening 20, as shown in FIGS. 2, 4, 6, 10, 13 and 19. In other embodiments, as shown in FIGS. 7, 8, 9, 11, 12, and 15, the annular opening 20 may be offset relative to the first and second outer walls 64, 66. The compressor inlet outer wall 26 may be positioned downstream from the annular opening 20.

Figure 6:
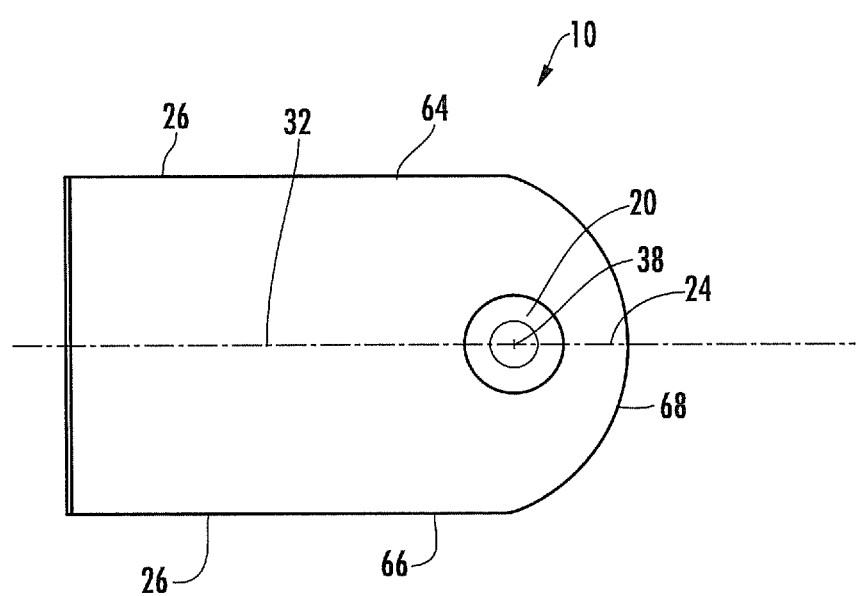
FIG. 6 is a cross-sectional axial view of another embodiment of a compressor inlet manifold taken at section line 2-2 in FIG. 1.
Figure 7:
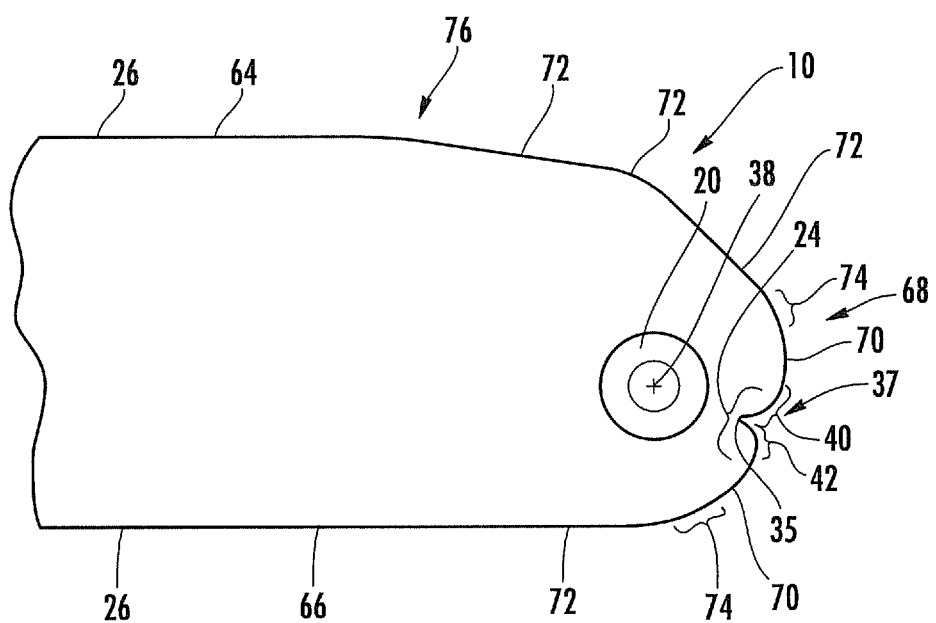
FIG. 7 is a cross-sectional axial view of yet another embodiment of a compressor inlet manifold taken at section line 2-2 in FIG. 1.
Figure 9:
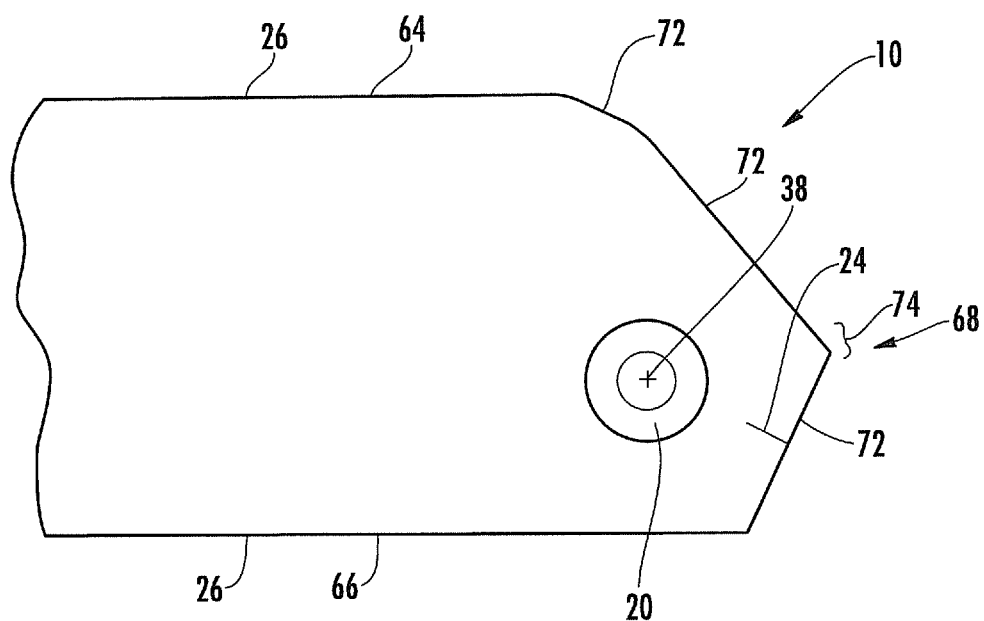
FIG. 9 is a cross-sectional axial view of still another embodiment of a compressor inlet manifold taken at section line 2-2 in FIG. 1.
Figure 10:
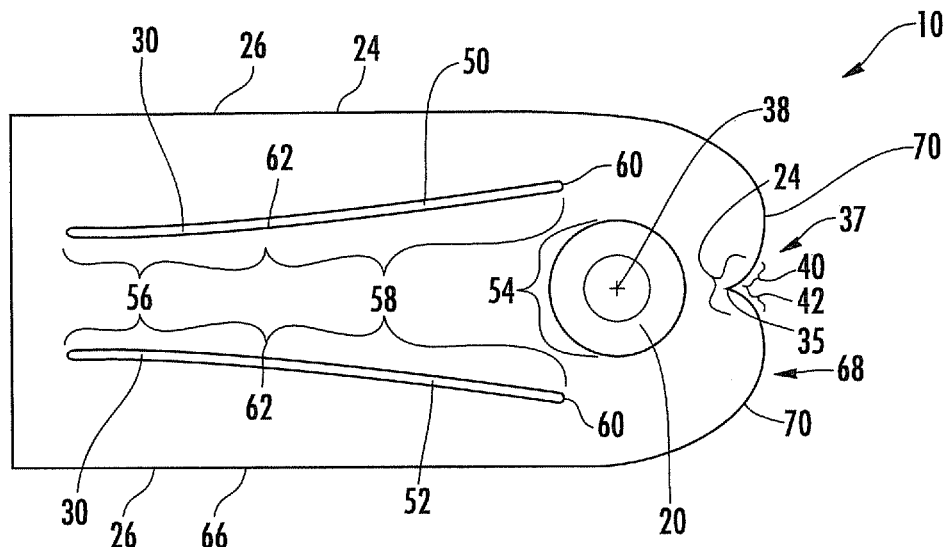
FIG. 10 is a cross-sectional axial view of yet another embodiment of a compressor inlet manifold taken at section line 2-2 in FIG. 1.
Figure 11:
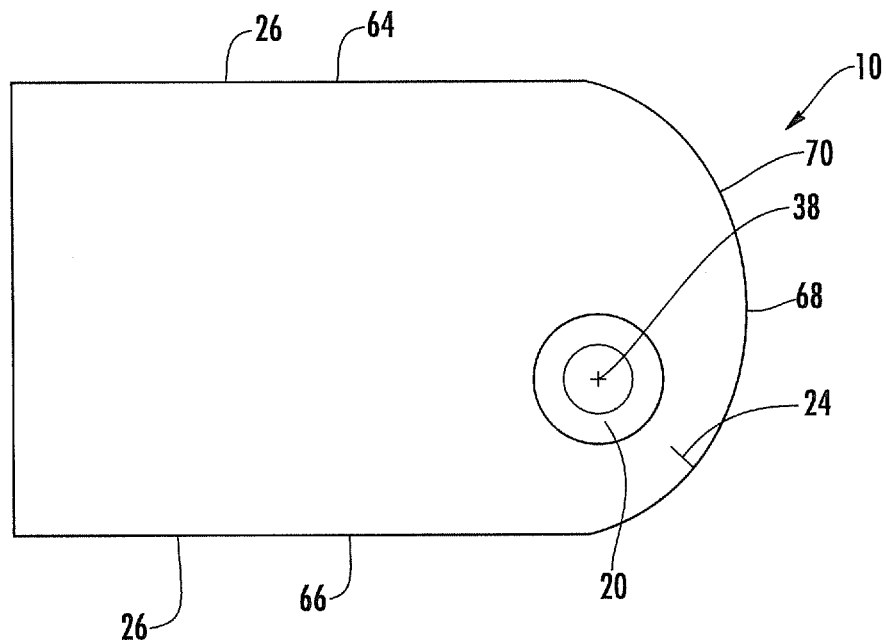
FIG. 11 is a cross-sectional axial view of still another embodiment of a compressor inlet manifold taken at section line 2-2 in FIG. 1.
Figure 12:
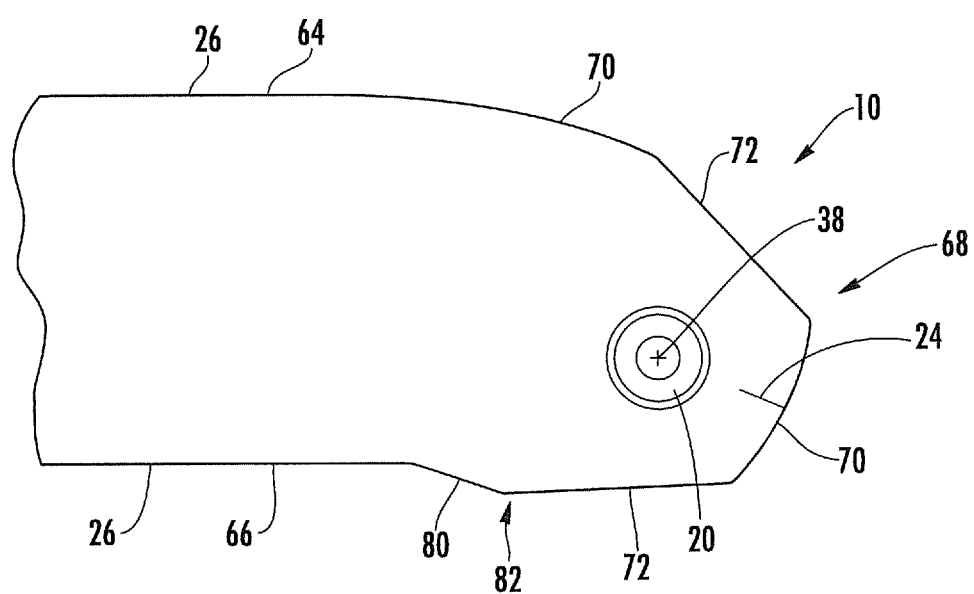
FIG. 12 is a cross-sectional axial view of another embodiment of a compressor inlet manifold taken at section line 2-2 in FIG. 1.

As shown in FIGS. 6 and 11, the compressor inlet outer wall 26 may be formed from first and second radially outer walls 64, 66 that generally oppose each other and are coupled together with an outer end wall 68, wherein the outer end wall 68 is formed from a single curved side. In another embodiment, as shown in FIGS. 7 and 10, the compressor inlet outer wall 26 may be formed from first and second radially outer walls 64, 66 that generally oppose each other and are coupled together with an outer end wall 68, wherein the outer end wall 68 is formed from a plurality of curved sides 70 coupled together in series. In yet another embodiment, as shown in FIGS. 9 and 12, the compressor inlet outer wall 26 may be formed from first and second radially outer walls 64, 66 that generally oppose each other and are coupled together with an outer end wall 68, wherein the outer end wall 68 is formed from a plurality of linear sides 72 coupled together at obtuse angles. As shown in FIGS. 7, 8, 9 and 12, the plurality of linear sides 72 may be coupled together via curved transition sections 74 smaller than the linear sides 72 forming the outer end wall 68.

As shown in FIG. 7, the compressor inlet outer wall 26 may be formed from the plurality of curved sides 70 extending on either side from the flow improvement projection 24. The compressor inlet outer wall 26 generally forms a semicircular enclosure. A plurality of linear sides 72 connect the upper curved side 70 to the first radially outer wall 64 on the upper side 76 of the compressor inlet manifold body 18. The compressor inlet outer wall 26 shown in FIG. 7, may include three linear sides 72.

Figure 8:
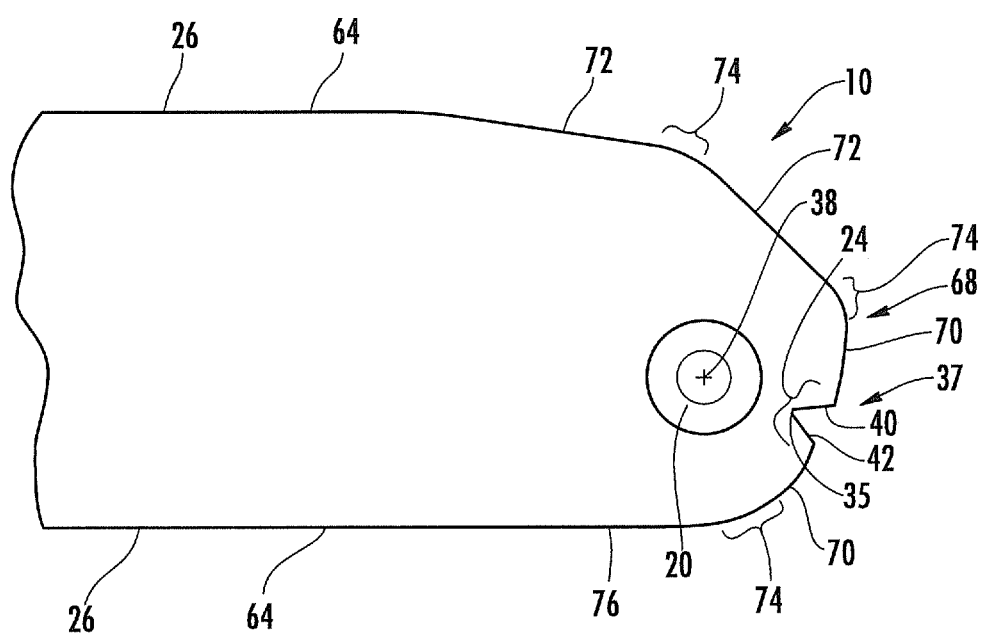
FIG. 8 is a cross-sectional axial view of another embodiment of a compressor inlet manifold taken at section line 2-2 in FIG. 1.

As shown in FIG. 8, the compressor inlet outer wall 26 may be formed from the plurality of curved sides 70 extending on either side from the flow improvement projection 24. The compressor inlet outer wall 26 generally forms a semicircular enclosure. A plurality of linear sides 72 connect the upper curved side 70 to the first radially outer wall 64 on the upper side 76 of the compressor inlet manifold body 18. The compressor inlet outer wall 26 shown in FIG. 7, may include two linear sides 72. The linear sides 72 may be coupled together and to the curved sides 70 with curved transition sections 74.

As shown in FIG. 9, the compressor inlet outer wall 26 may be formed from a plurality of linear sides 72 extending on either side from the flow improvement projection 24. The compressor inlet outer wall 26 generally forms a semicircular enclosure. The linear sides 72 may be coupled together at obtuse angles. The compressor inlet outer wall 26 may include three linear sides 72. One or more of the linear sides 72 may be coupled together and to the curved sides 70 with curved transition sections 74.

As shown in FIG. 12, the compressor inlet outer wall 26 may be formed from a plurality of linear sides 72 extending on either side from the flow improvement projection 24. The linear sides 72 may be coupled together at obtuse angles. The compressor inlet outer wall 26 may include two linear sides 72 separated by curved sides 70. An outwardly curved side 80 creates a depression 82 radially outward from the second radially outer wall 66. The outwardly curved side may be coupled to another curved side 70 with a linear side 72. The compressor inlet outer wall 26 may include three curved sides 70 and two linear sides 72 that generally form a semicircular enclosure.

Figure 17:
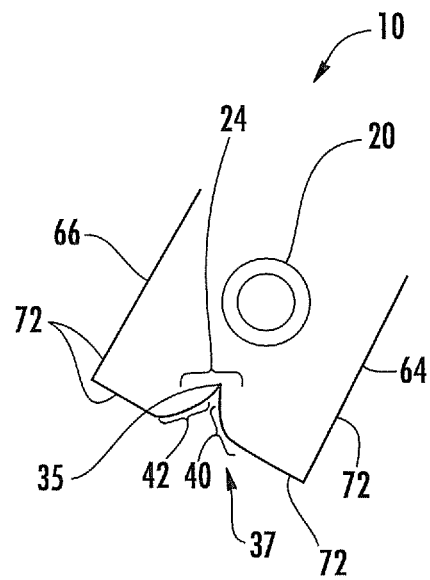
FIG. 17 is a side view of another embodiment of the compressor inlet manifold shown in FIG. 2.

As shown in FIG. 17, the compressor inlet outer wall 26 may be formed from the first and second radially outer walls 64, 66 and a single linear side 72 extending therebetween. The linear side 72 may include a flow improvement projection 24 extending inwardly toward the annular opening 20. The linear side 72 may be positioned orthogonally to the first and second radially outer walls 64, 66.

Figure 18:
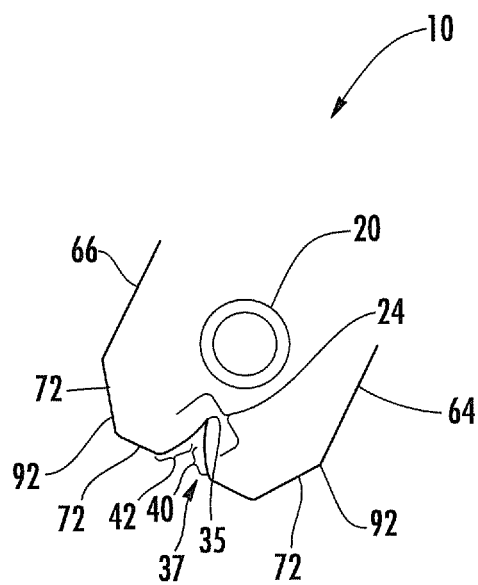
FIG. 18 is a side view of yet another embodiment of the compressor inlet manifold shown in FIG. 2.

As shown in FIG. 18, the compressor inlet outer wall 26 may be formed from the first and second radially outer walls 64, 66 and three linear sides 72 extending therebetween. Two of the linear sides 72 may be formed as modified linear corners 92 of the compressor inlet outer wall 26. The linear side 72 may include a flow improvement projection 24 extending inwardly toward the annular opening 20. The linear side 72 at the end may be positioned orthogonally to the first and second radially outer walls 64, 66.

The compressor inlet manifold 10 may also include a compressor airflow inlet 14 in fluid communication with the radial airflow inlet 12 and the annular opening 20. The compressor airflow inlet 14 may be positioned on an opposite side of the compressor inlet manifold 10 from the compressor inlet outer wall 26. The compressor airflow inlet 14 may have any appropriate configuration. In at least one embodiment, the compressor airflow inlet 14 may have a width that is wider than a diameter of the annular opening 20, and may be, but is not limited to being, about twice a diameter of the annular opening 20.

Figure 2:
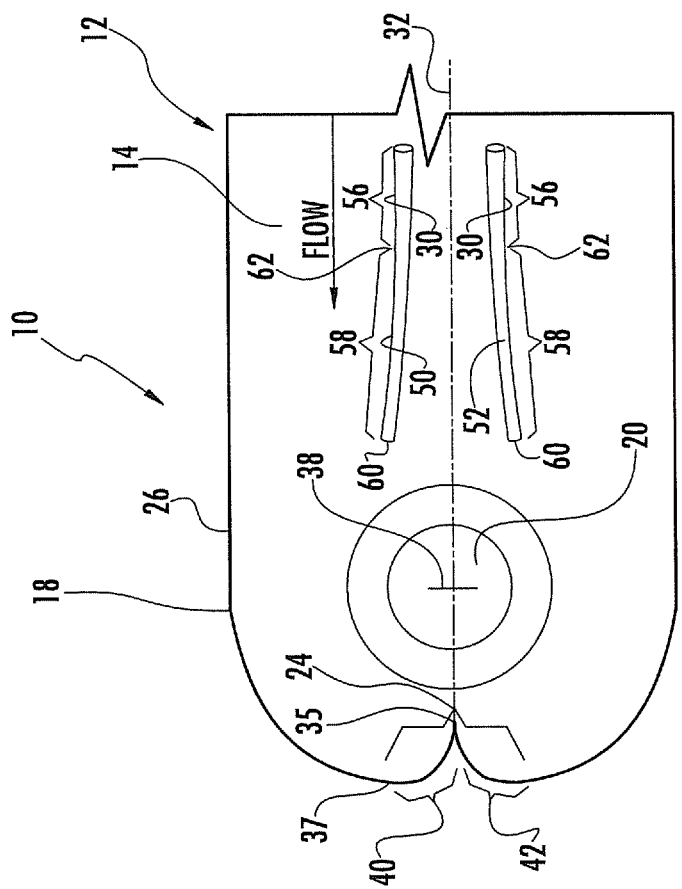
FIG. 2 is a cross-sectional axial view of a compressor inlet manifold having features according to the instant invention taken at section line 2-2 in FIG. 1.
Figure 19:
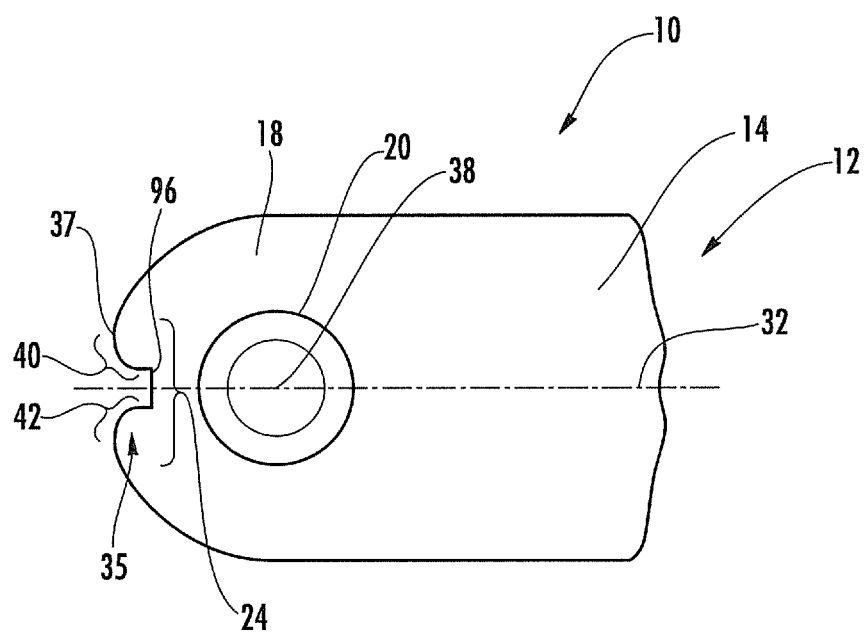
FIG. 19 is a side view of another embodiment of the compressor inlet manifold shown in FIG. 2.

The compressor inlet outer wall 26 may include a flow improvement projection 24 extending radially inward relative to other aspects of the compressor inlet outer wall 26. In one embodiment, the flow improvement projection 24 may be formed from a cusp 35 that points at a center 38 of the annular opening 20. As shown in FIGS. 2 and 19, the flow improvement projection 24 may be formed from curved first and second sides 40, 42. In addition, as shown in FIG. 19, the flow improvement projection 24 includes linear surface 96 extending between the first and second sides 40, 42. In at least one embodiment, the linear surface 96 may be generally orthogonal to the axis 32. The linear surface 86 may be positioned in close proximity to the annular opening 20. The first and second sides 40, 42 may be mirror images of each other, as shown in FIGS. 7, 8, 9, 11, 12, and 15, or may be configured differently, as shown in FIGS. 2, 4, 6, 10, 13. The flow improvement projection 24 may be formed from curved first and second sides 40, 42 having a smaller radii than the compressor inlet outer wall 26. A distal point forming the cusp 35 at which the first and second sides 40, 42 has a smaller cross-sectional area than a proximal base 37 from which the flow improvement projection 24 extends.

Figure 4:
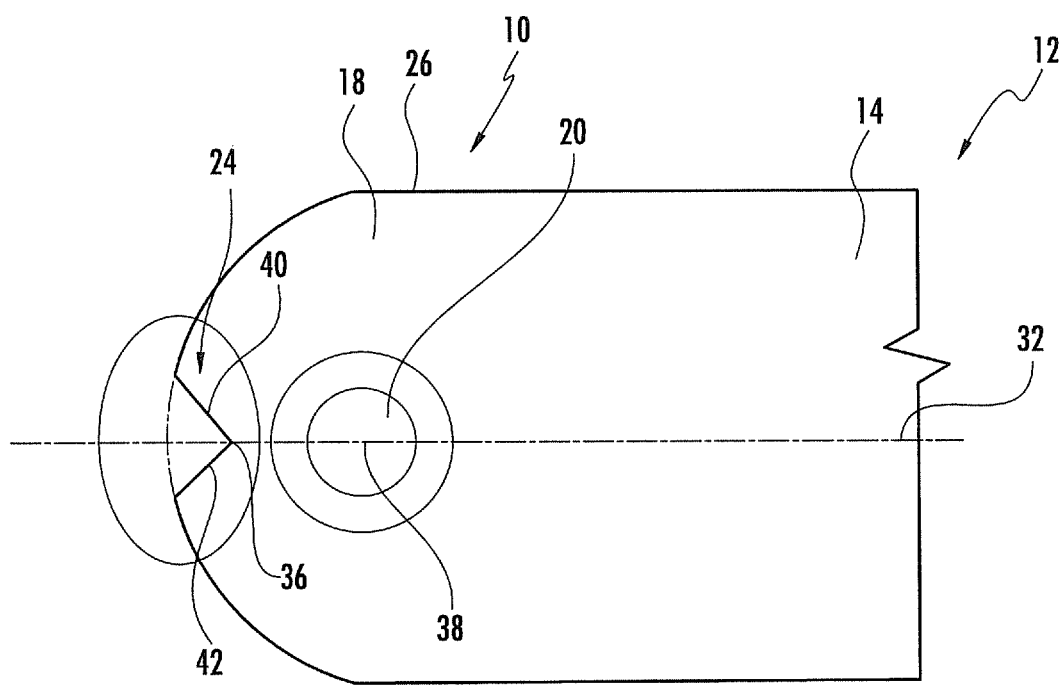
FIG. 4 is a cross-sectional axial view of another embodiment of a compressor inlet manifold taken at section line 2-2 in FIG. 1.

In another embodiment, as shown in FIG. 4, the flow improvement projection 24 may be formed from linear first and second sides 40, 42. The flow improvement projection 24 may have a width that is less than a diameter of the annular opening 20. The flow improvement projection 24 may extend radially inward from the compressor inlet outer wall 26 a distance less than a diameter of the annular opening 20, and in at least one embodiment, a distance equal to about one half of the diameter of the annular opening 20. A distal point forming the cusp 35 at which the first and second sides 40, 42 has a smaller cross-sectional area than a proximal base 37 from which the flow improvement projection 24 extends.

As shown in FIGS. 6, 9, 11 and 12, flow improvement projection 24 is formed from a linear plate that extends toward a center 38 of the annular opening 20. As shown in FIGS. 2, 4, 6, 10, 13 and 19, the flow improvement projection 24 may be positioned equidistant between opposing portions of the compressor inlet outer wall 26 that form first and second radially outer walls 64, 66. In other embodiments, as shown in FIGS. 7, 8, 9, 11, 12 and 15, the flow improvement projection 24 may be offset such that the flow improvement projection 24 is closer to a second radially outer wall 66 forming a portion of the compressor inlet outer wall 26 than a first radially outer wall 64 forming a portion of the compressor inlet outer wall 26 opposite to the second radially outer wall 66. The flow improvement projection 24 may be offset such that the flow improvement projection 24 may be closer to the second radially outer wall 66 than the annular opening 20. The engine centerline may be offset from the centerline of the compressor inlet manifold 10. The flow improvement projection 24 may extend from a linear side 72 of the outer end wall 68 that is positioned at an obtuse angle relative to the second radially outer wall 66.

Figure 3:
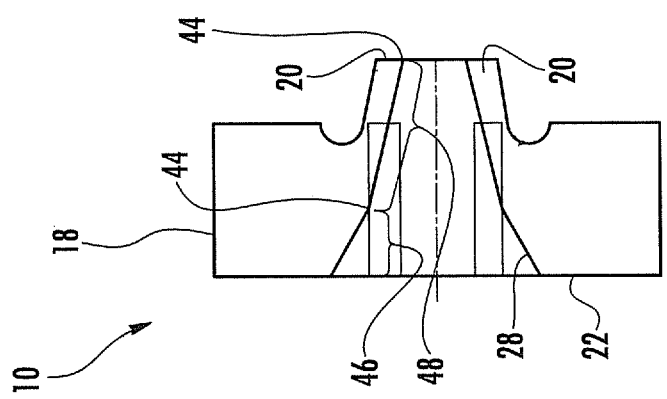
FIG. 3 is a side view of the compressor inlet manifold shown in FIG. 2.
Figure 5:
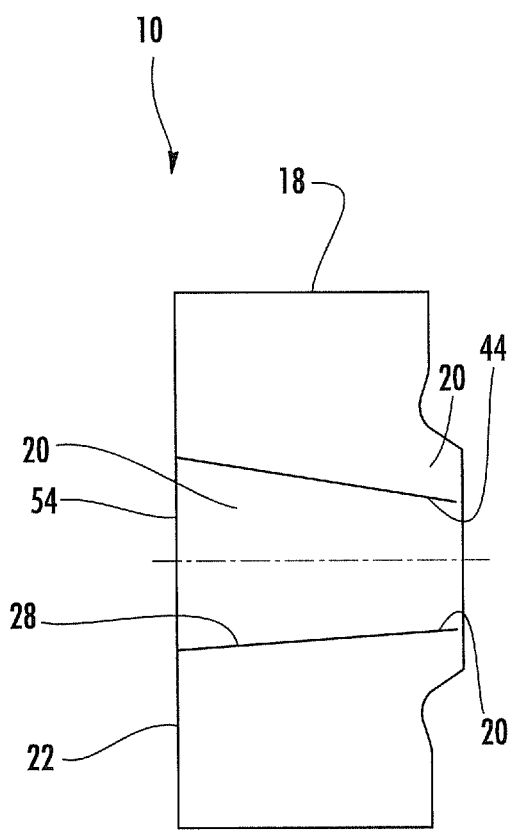
FIG. 5 is a side view of the compressor inlet manifold shown in FIG. 4.
Figure 16:
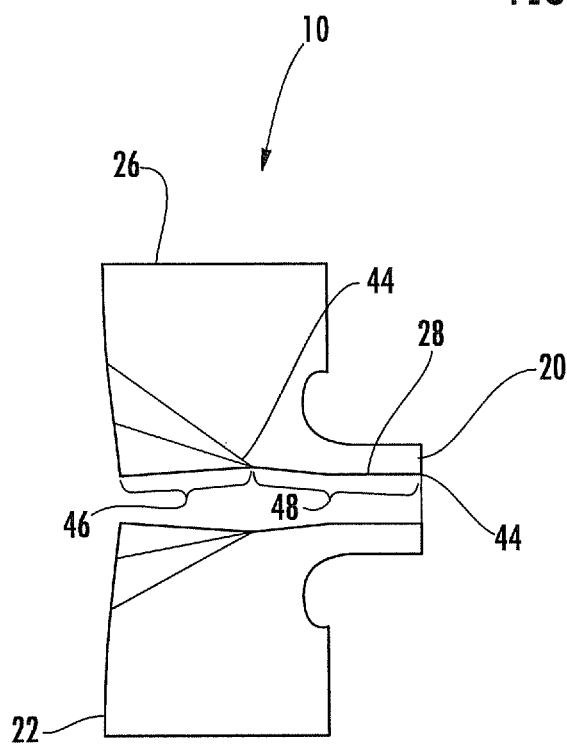
FIG. 16 is a side view of the compressor inlet manifold shown in FIG. 2 with variable configuration of the conically shaped inner sidewall.

As shown in FIGS. 3 and 5, the annular opening 20 may be formed in part or wholly from a cylindrical sidewall 28. The annular opening 20 may also be formed in part or wholly from a conically shaped inner sidewall 28 with a smaller diameter 44 positioned downstream. As shown in FIG. 16, the conically shaped inner sidewall 28 may be configured with different shapes, such as with different angular positions. In particular, the first conically shaped inner sidewall 46 may be smaller than the second conically shaped inner sidewall 48, or vice versa. As shown in the embodiment of FIG. 3, the annular opening 20 may be formed from a first conically shaped inner sidewall 46 with a yet smaller diameter 44 positioned downstream and a second conically shaped inner sidewall 48 with a smaller diameter 44 positioned downstream, wherein the second conically shaped inner sidewall 48 may be steeper than the first conically shaped inner sidewall 46.

As shown in FIGS. 2, 4, 6, 10, 13, 17, 18 and 19, the annular opening 20 may be positioned equidistant between opposing portions of the compressor inlet outer wall 26 that form first and second radially outer walls 64, 66. In other embodiments, as shown in FIGS. 7, 8, 9, 11, 12 and 15, the annular opening 20 may be offset such that the annular opening 20 is closer to a second radially outer wall 66 forming a portion of the compressor inlet outer wall 26 than a first radially outer wall 64 forming a portion of the compressor inlet outer wall 26 opposite to the second radially outer wall 66.

Figure 14:
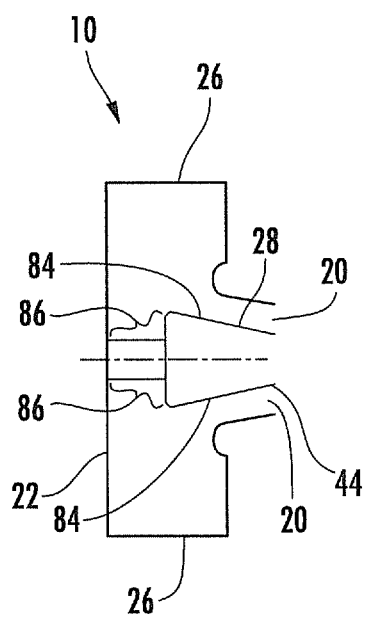
FIG. 14 is a side view of the compressor inlet manifold shown in FIG. 13.
Figure 13:
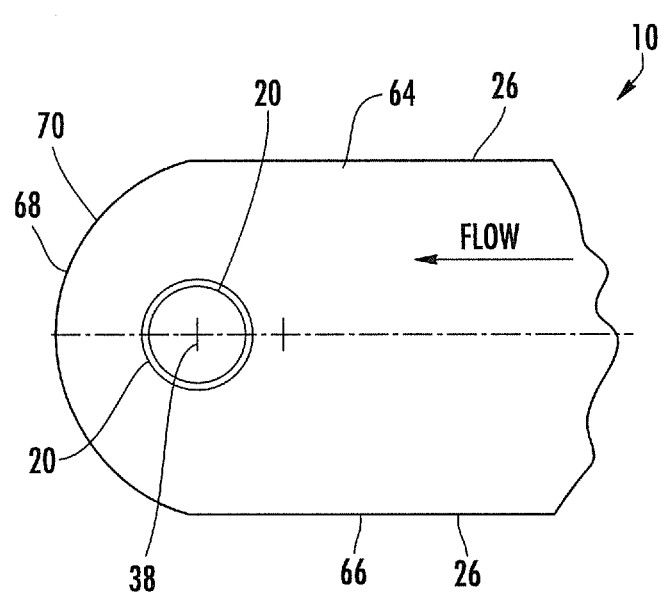
FIG. 13 is a cross-sectional axial view of another embodiment of a compressor inlet manifold taken at section line 2-2 in FIG. 1.

As shown in FIG. 14, the annular opening 20 may be formed from an downstream inner sidewall 84 and a upstream inward recess 86 radially inward and downstream from the downstream inner sidewall 84. The downstream inner sidewall 84 may be conically shaped with a cross-sectional area that increases in size moving downstream.

Figure 15:
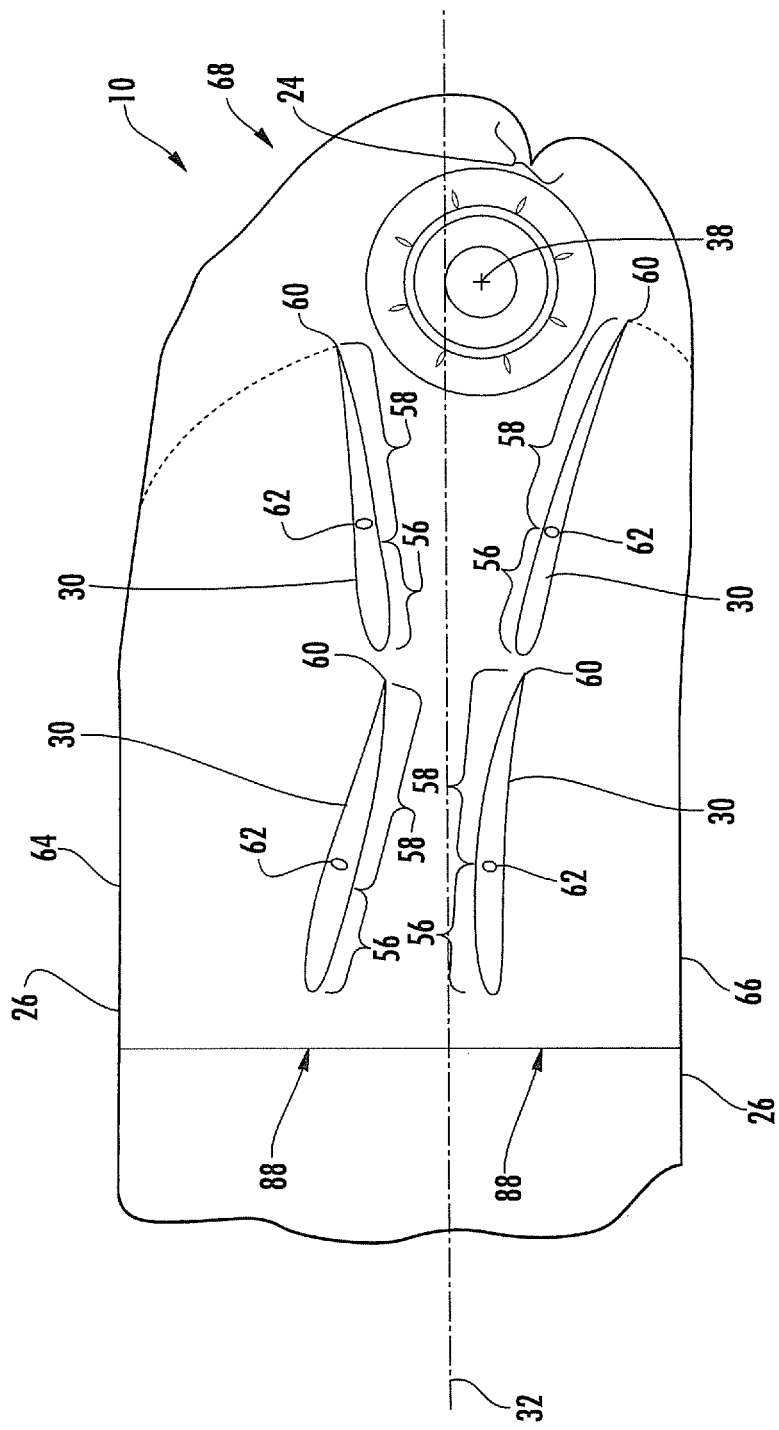
FIG. 15 is a cross-sectional axial view of another embodiment of a compressor inlet manifold having features, such as multiple baffles, taken at section line 2-2 in FIG. 1.

As shown in FIGS. 2, 10 and 15, one or more baffles 30 may be positioned radially upstream from the annular opening 20 such that the baffles 30 extend radially inward toward the annular opening 20. The baffle 30 may be angled radially outward from the annular opening 20 such that the baffle 30 is positioned at an acute angle relative to the axis 32 aligned with a radially inward air flow. The baffle 30 may be positioned radially upstream from the annular opening 20 and may comprise a first baffle 50 and a second baffle 52 that is a mirror image of first baffle 50 about the axis 32. The baffle 30 may be shaped like an airfoil with a leading edge, trailing edge and suction and pressure sides. The baffle 30 may have a length that is greater than a width of the annular opening 20. The baffle 30 may include an upstream section 56 that is generally linear, and a downstream section 58 that is generally linear and positioned at an obtuse angle relative to the upstream section 56. The baffle 30 may taper at a trailing edge 60 of the baffle 30 such that the trailing edge 60 has a width that is less than a width in a mid-section 62 of the baffle 30. As shown in FIG. 10, a trailing edge 78 of the baffles 50, 52 may extend radially outward for an outermost aspect of the annular opening 20.

As shown in FIGS. 2, 10 and 15, the compressor inlet manifold may include a plurality of baffles 30. As shown in FIG. 15, the plurality of baffles 30 may form two rows 88, wherein each row 88 has multiple baffles 30 in series. The baffles 30 may be pivotably positioned within the compressor inlet manifold body 18 such that the position of the baffle 30 may be changed to modify the flow of air into the annular opening 20. The baffles 30 may be rotated, as shown in dotted lines in FIG. 15 such that a trailing edge 60 of the baffles contacts the first and second radially outer wall 64, 66 to restrict air flow. The trailing edge 60 of the baffle 30 may terminate radially outward of the annular opening 20.

During use, air flows through the radial airflow inlet 12 and into the compressor inlet manifold 10. The airflow is conditioned in the compressor inlet manifold 10. In particular, the air flows past one or more baffles 30, which impart a radially outward vector to the direction of airflow towards the annular opening 20. The air may also contact the compressor inlet outer wall 26, wherein the direction of the air is redirected by the flow improvement projection 24 such that the air is further redirected back towards the annular opening 20. The compressor inlet manifold 10 may provide air flow with reduced turbulence to the compressor 16 which enables the required design surge margin to be reduced, thereby increasing gas turbine engine efficiency. The improved air flow has reduced distortion, turbulence and unsteadiness. The air is exhausted into the axial compressor inlet 14.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A compressor inlet manifold for directing air from a radial airflow inlet into an axial compressor inlet of a compressor of a gas turbine engine, comprising:
   a compressor inlet manifold body having at least one annular opening extending axially downstream from an upstream wall;
   a compressor inlet outer wall at least partially extending around the at least one annular opening;
   a compressor airflow inlet in fluid communication with the radial airflow inlet and the at least one annular opening, wherein the compressor airflow inlet is positioned on an opposite side of the at least one annular opening from the compressor inlet outer wall;
   wherein the compressor inlet outer wall includes a flow improvement projection extending radially inward relative to other aspects of the compressor inlet outer wall; and wherein the at least one annular opening is formed from an downstream inner sidewall and a upstream inward recess radially inward and downstream from the downstream inner sidewall.

2. The compressor inlet manifold of claim 1 further comprising
at least one baffle positioned radially upstream from the at least one annular opening such that the baffle extends radially inward toward the at least one annular opening and is angled radially outward from the at least one annular opening such that the at least one baffle is positioned at an acute angle relative to an axis aligned with a radially inward air flow.

3. The compressor inlet manifold of claim 2, wherein the flow improvement projection is formed from a linear plate that extends toward a center of the at least one annular opening.

4. The compressor inlet manifold of claim 2, wherein the flow improvement projection is formed from a cusp that points at a center of the at least one annular opening.

5. The compressor inlet manifold of claim 4, wherein the flow improvement projection is formed from curved first and second sides, wherein a distal point at which the first and second sides has a smaller cross-sectional area than a proximal base from which the flow improvement projection extends.

6. The compressor inlet manifold of claim 4, wherein the flow improvement projection is formed from curved first and second sides coupled together with a generally linear side.

7. The compressor inlet manifold of claim 4, wherein the flow improvement projection is formed from linear first and second sides, wherein a distal point at which the first and second sides has a smaller cross-sectional area than a proximal base from which the flow improvement projection extends.

8. The compressor inlet manifold of claim 2, wherein the at least one annular opening is positioned equidistant between opposing portions of the compressor inlet outer wall that form first and second radially outer walls.

9. The compressor inlet manifold of claim 2, wherein the at least one annular opening is offset such that the at least one annular opening is closer to a first radially outer wall forming a portion of the compressor inlet outer wall than a second radially outer wall forming a portion of the compressor inlet outer wall opposite to the first radially outer wall.

10. The compressor inlet manifold of claim 2, wherein the flow improvement projection is positioned equidistant between opposing portions of the compressor inlet outer wall that form first and second radially outer walls.

11. The compressor inlet manifold of claim 2, wherein the flow improvement projection is offset such that the flow improvement projection is closer to a second radially outer wall forming a portion of the compressor inlet outer wall than a first radially outer wall forming a portion of the compressor inlet outer wall opposite to the second radially outer wall.

12. The compressor inlet manifold of claim 11, wherein the flow improvement projection is offset such that the flow improvement projection is closer to the second radially outer wall than the at least one annular opening.

13. The compressor inlet manifold of claim 2, wherein the flow improvement projection is offset such that the flow improvement projection is closer to the second radially outer wall than the at least one annular opening.

14. The compressor inlet manifold of claim 2, wherein the compressor inlet outer wall is formed from first and second radially outer walls that generally oppose each other and are coupled together with an outer end wall, wherein the outer end wall is formed from a single curved side.

15. The compressor inlet manifold of claim 2, wherein the compressor inlet outer wall is formed from first and second radially outer walls that generally oppose each other and are coupled together with an outer end wall, wherein the outer end wall is formed from a plurality of curved sides coupled together in series.

16. The compressor inlet manifold of claim 2, wherein the compressor inlet outer wall is formed from first and second radially outer walls that generally oppose each other and are coupled together with a single linear side extending therebetween.

17. The compressor inlet manifold of claim 2, wherein the compressor inlet outer wall is formed from first and second radially outer walls that generally oppose each other and are coupled together with an outer end wall, wherein the outer end wall is formed from a plurality of linear sides coupled together at obtuse angles.

18. The compressor inlet manifold of claim 17, wherein the plurality of linear sides are coupled together via curved transition sections smaller than the linear sides forming the outer end wall.

19. The compressor inlet manifold of claim 17, wherein the flow improvement projection extends from a linear side of the outer end wall that is positioned at an acute angle relative to the second radially outer wall.

20. The compressor inlet manifold of claim 2, wherein at least a portion of an inner surface forming the at least one annular opening is formed from a cylindrical sidewall.

21. The compressor inlet manifold of claim 2, wherein the at least one baffle positioned radially upstream from the at least one annular opening comprises a first baffle and a second baffle that is a mirror image of first baffle about the axis.

22. The compressor inlet manifold of claim 2, wherein the at least one baffle has a length that is greater than a width of an opening of the at least one annular opening.

23. The compressor inlet manifold of claim 2, wherein the at least one baffle has an upstream section that is generally linear, and a downstream section that is generally linear and positioned at an obtuse angle relative to the upstream section.

24. The compressor inlet manifold of claim 2, wherein the at least one baffle tapers at a trailing edge of the at least one baffle such that the trailing edge has a width that is less than a width in a mid-section of the at least one baffle.

25. The compressor inlet manifold of claim 2, wherein the at least one baffle comprises a plurality of baffles.

26. The compressor inlet manifold of claim 2, wherein the plurality of baffles form two rows, wherein each row has multiple baffles in series.

27. The compressor inlet manifold of claim 2, wherein the at least one baffle is pivotably positioned within the compressor inlet manifold body such that the position of the at least one baffle may be changed.

28. The compressor inlet manifold of claim 2, wherein a trailing edge of the at least one baffle terminates radially outward of the at least one annular opening.

29. The compressor inlet manifold of claim 1, wherein the downstream inner sidewall is conically shaped with a cross-sectional area that increases moving downstream.

30. A compressor inlet manifold for directing air from a radial airflow inlet into an axial compressor inlet of a compressor of a gas turbine engine, comprising:
a compressor inlet manifold body having at least one annular opening extending axially downstream from an upstream wall;

a compressor inlet outer wall at least partially extending around the at least one annular opening;

a compressor airflow inlet in fluid communication with the radial airflow inlet and the at least one annular opening, wherein the compressor airflow inlet is positioned on an opposite side of the at least one annular opening from the compressor inlet outer wall;

wherein the compressor inlet outer wall includes a flow improvement projection extending radially inward relative to other aspects of the compressor inlet outer wall;

wherein the flow improvement projection is formed from curved first and second sides having a smaller radii than the compressor inlet outer wall;

at least one baffle positioned radially upstream from the at least one annular opening such that the baffle extends radially inward toward the at least one annular opening and is angled radially outward from the at least one annular opening such that the at least one baffle is positioned at an acute angle relative to an axis aligned with a radially inward air flow; and wherein the at least one annular opening is formed from an downstream inner sidewall and a upstream inward recess radially inward and downstream from the downstream inner sidewall.

31. The compressor inlet manifold of claim 30, wherein the flow improvement projection is formed from a cusp that points at a center of the at least one annular opening.

32. The compressor inlet manifold of claim 30, wherein the at least one annular opening is formed from a first conically shaped inner sidewall with a smaller diameter positioned downstream and a second conically shaped inner sidewall with a smaller diameter positioned downstream, wherein the second conically shaped inner sidewall is steeper than the first conically shaped inner sidewall.

33. The compressor inlet manifold of claim 30, wherein the at least one baffle positioned radially upstream from the at least one annular opening comprises a first baffle and a second baffle that is a mirror image of first baffle about the axis.

34. The compressor inlet manifold of claim 33, wherein the at least one baffle has a length that is greater than a width of an opening of the at least one annular opening; wherein the at least one baffle has an upstream section that is generally linear, and a downstream section that is generally linear and positioned at an obtuse angle relative to the upstream section; and wherein the at least one baffle tapers at a trailing edge of the at least one baffle such that the trailing edge has a width that is less than a width in a mid-section of the at least one baffle.

* * * * *